United States Patent
Schillert et al.

(10) Patent No.: US 8,783,065 B2
(45) Date of Patent: Jul. 22, 2014

(54) METHOD FOR BENDING AND THERMALLY PRESTRESSING RADIATION SHIELDING GLASS

(75) Inventors: Horst Schillert, Gruenenplan (DE); Dirk Roessler, Gruenenplan (DE); Detlef Mevers, Holzen (DE)

(73) Assignee: Schott AG, Mainz (DE)

( * ) Notice: Subject to any disclaimer, the term of this patent is extended or adjusted under 35 U.S.C. 154(b) by 516 days.

(21) Appl. No.: 12/790,059

(22) Filed: May 28, 2010

(65) Prior Publication Data
US 2010/0316847 A1    Dec. 16, 2010

(30) Foreign Application Priority Data

May 28, 2009  (DE) .......................... 10 2009 024 234
Jul. 28, 2009  (DE) .......................... 10 2009 036 164

(51) Int. Cl.
| | |
|---|---|
| C03B 23/025 | (2006.01) |
| C03B 23/03 | (2006.01) |
| C03B 23/035 | (2006.01) |
| C03B 27/04 | (2006.01) |
| C03B 40/00 | (2006.01) |
| C03B 27/044 | (2006.01) |
| C22C 38/22 | (2006.01) |

(52) U.S. Cl.
CPC ......... *C03B 23/0252* (2013.01); *C03B 27/0413* (2013.01); *C03B 40/005* (2013.01); *C03B 27/0445* (2013.01); *C03B 23/0302* (2013.01); *C03B 23/0357* (2013.01); *C22C 38/22* (2013.01)
USPC ............................................. 65/106; 65/107

(58) Field of Classification Search
CPC .............. C03B 23/023; C03B 23/0252; C03B 23/0256; C03B 23/03; C03B 23/0307; C03B 23/035; C03B 23/0357; C03B 25/00; C03B 25/02; C03B 25/025; C03B 25/04
USPC ........................................................... 65/107
See application file for complete search history.

(56) References Cited

U.S. PATENT DOCUMENTS 1,449,789 A * 3/1923 Smith ............................ 420/36
2,736,714 A    2/1956 Tiede
(Continued)

FOREIGN PATENT DOCUMENTS

DE    31 14 881 A1    10/1982
DE    36 35 834        5/1988
(Continued)

*Primary Examiner* — Joseph S Del Sole
*Assistant Examiner* — Cynthia Szewczyk
(74) *Attorney, Agent, or Firm* — Harness, Dickey & Pierce, P.L.C.

(57) ABSTRACT

A method for bending radiation shielding glass which has a heavy metal oxide content of at least 50% by weight is provided, wherein first a mold is provided, a glass plate comprising a radiation shielding glass is then provided, the mold is preheated to a temperature of 300 to 400° C., the glass plate is placed on the mold, the glass plate and the mold are heated in a furnace to a temperature of 370 to 430° C., then heated together to a temperature of 400° C. to 500° C., preferably to 440 to 500° C., the total heating time being at least 30 minutes, preferably at least 60 minutes, the glass plate is then molded and finally the molded glass is cooled by means of a cooling program over a period of at least 60 minutes. For thermal prestressing, the glass body is supported at least at its outer periphery at a number of support points, introduced into a preheated furnace, heated to 400 to 500° C. and then removed, and cold air is blown onto both sides from a multiplicity of nozzles, preferably until cooling to about 100° C. has taken place.

17 Claims, 2 Drawing Sheets

(56) References Cited

U.S. PATENT DOCUMENTS

| | | | |
|---|---|---|---|
| 3,155,748 A * | 11/1964 | Couri | 264/1.21 |
| 3,414,395 A * | 12/1968 | Reese et al. | 65/107 |
| 3,511,628 A * | 5/1970 | Adamson | 65/107 |
| 4,043,782 A * | 8/1977 | Bamford et al. | 65/104 |
| 4,072,492 A | 2/1978 | Castine, Jr. | |
| 4,115,090 A * | 9/1978 | Comperatore | 65/25.4 |
| 4,375,978 A | 3/1983 | Reese et al. | |
| 4,880,453 A * | 11/1989 | Coppola et al. | 65/23 |
| 5,073,524 A | 12/1991 | Speit | |
| 5,232,482 A * | 8/1993 | Laakso et al. | 65/104 |
| 5,372,624 A | 12/1994 | Lesage et al. | |
| 5,672,189 A * | 9/1997 | Funk et al. | 65/29.19 |
| 2008/0149863 A1 | 6/2008 | Rodriguez Cuartas et al. | |
| 2009/0068455 A1 | 3/2009 | Albrecht et al. | |
| 2010/0000259 A1* | 1/2010 | Ukrainczyk et al. | 65/104 |

FOREIGN PATENT DOCUMENTS

| | | |
|---|---|---|
| DE | 100 55 830 A1 | 5/2002 |
| DE | 20 2008 003 804 U1 | 7/2009 |
| EP | 2 036 714 A1 | 3/2009 |
| FR | 829.348 | 6/1938 |
| JP | 1-308843 | 12/1989 |
| JP | 3-17046 | 7/1991 |
| JP | 3-50138 | 3/1994 |
| JP | 2000-327367 | 11/2000 |
| JP | 2001-500836 | 1/2001 |
| JP | 2008-286787 | 11/2008 |
| WO | WO 82/03621 | 10/1982 |
| WO | WO 99/05069 | 2/1999 |

* cited by examiner

METHOD FOR BENDING AND THERMALLY PRESTRESSING RADIATION SHIELDING GLASS

CROSS REFERENCES TO RELATED APPLICATIONS

This application claims priority from German patent application 10 2009 036 164.2, filed on Jul. 28, 2009, and from German patent application 10 2009 024 234.1 filed on May 28, 2009. The entire contents of these priority applications are incorporated herein by reference.

BACKGROUND OF THE INVENTION

The invention relates to a method for bending radiation shielding glass and a method for thermally prestressing a radiation shielding glass or a glass body consisting thereof.

Within the scope of this application, a "radiation shielding glass" is understood as meaning a glass which meets the requirements for lead glass panes according to the German and European standards DIN EN 61331-1 (August 2006 version) and DIN EN 61331-2 (April 2002 version), i.e. the attenuation equivalent in mm Pb must not be less than 0.22 times the minimum permitted lead glass plane in millimeters. The above standards are based on the international standard IEC 61331-1:1994 and IEC 61331-2:1994 and are harmonized therewith.

Such radiation shielding glasses are used as shielding glasses against X-rays and gamma rays in the medical and industrial sector. They are installed in particular in radiation shielding doors and windows. The attenuation equivalent is determined according to the standard by comparison between the radiation shielding effect of a lead glass plate and a plate comprising radiation shielding glass. An attenuation equivalent of 0.22 means that the radiation shielding glass at its permitted minimum thickness still has 22% of the shielding effect of a lead glass plate of the same thickness.

In the narrow sense, a radiation shielding glass is understood as meaning a glass which, according to the above standards, has an attenuation equivalent of at least 25%, preferably of at least 28%, for a nominal thickness between 6.5 and 25 mm at a tube voltage of up to 200 kV with 1.2 mm Cu total filtering.

Said glass may be, for example, a glass which has a heavy metal oxide content of at least 50% by weight. It may be, for example, a heavy flint glass which preferably has a lead oxide content of at least 60% by weight.

As a result of this high heavy metal oxide content, such glasses have a high density (more than 4000 $kg/m^3$ or even more than 4900 $kg/m^3$) and a relatively low transformation temperature (<500° C.).

Such glasses moreover have reduced mechanical and chemical stability or strength of the surfaces compared with conventional soda-lime glasses.

A 2- or 3-dimensional deformation of such glasses and also thermal prestressing of such glasses are not possible by known bending methods (cf. for example U.S. Pat. No. 5,372,624).

This document discloses an apparatus and a method for bending a glass plate, the glass plate being held in a bending cell in an upper bending mold perpendicularly to an annular counter-mold which has an element for supporting the middle part of the glass plate in the bending cell. The annular counter-mold is raised in order to press the glass plate against the upper bending mold. The bending temperature here is about 650° C.

A radiation shielding glass cannot be bent in this way. Rather, particular measures have to be taken in order to take into account the particularly high weight and the low transformation temperature.

SUMMARY OF THE INVENTION

It is a first object of the invention to disclose a method for bending radiation shielding glass, by means of which reliable bending of the glass into a desired 2-dimensional or 3-dimensional shape with high quality is ensured.

It is a second object of the invention to disclose a method for bending radiation shielding glass which avoids the danger of damage to the glass.

It is a third object of the invention to disclose a method for thermally prestressing such a radiation shielding glass.

According to the invention, these and other objects are achieved by a method for bending radiation shielding glass, comprising the following steps:

(a) providing a mold;
(b) providing a glass plate comprising a radiation shielding glass;
(c) preheating the mold to a temperature of 300 to 400° C.;
(d) placing the glass plate on the mold;
(e) heating the glass plate and the mold together to a temperature of 370 to 430° C.;
(f) heating to a temperature of 400° C. to 500° C., preferably to a temperature of 440 to 500° C., steps (e) and (f) together lasting for at least 30 minutes, preferably at least 60 minutes;
(g) molding the glass plate and
(h) cooling the molded glass by means of a cooling program over a period of at least 60 minutes, preferably over at least 120 minutes.

The invention is completely achieved in this manner.

It has been found that, with such a temperature program, a glass plate comprising a radiation shielding glass can be molded with high precision.

In the simplest case, the glass plate can be molded here under the influence of gravity.

Owing to the high weight of the glass plate, the bending under the influence of gravity leads to substantially better results than in the molding of conventional glass plates.

Preferably, the heating, molding and cooling in this method variant are effected inside a furnace.

According to a further variant of the method, the molding process is supported by application of a vacuum.

In this way, the molding process itself can be accelerated and even higher precision in complying with the geometrical tolerances of the bent or molded radiation shielding glass can be achieved.

According to a further configuration of the invention, the glass plate is pressed into the mold by a male mold which preferably consists of an aluminum alloy or a magnesium alloy.

As a result, the molding process can be accelerated and moreover particularly high precision in complying with the geometrical parameters can be ensured.

Here, the male mold preferably has, on its surface, a release layer which preferably consists of a woven glass filament fabric.

Adhesion to the male mold is avoided thereby.

Here, the male mold is preferably preheated to a temperature which is at least 100 K below the preheating temperature of the mold, preferably 120 to 180° C., more preferably 140 to 160° C.

According to a further configuration of the invention, the contact pressure is not more than 15 bar, preferably not more than 10 bar, more preferably not more than 8 bar, and is gradually built up.

For example, a pneumatic cylinder which gradually builds up the maximum pressure can be used for this purpose.

The pressing time is preferably 2 to 30 seconds, more preferably 3 to 10 seconds, particularly preferably 4 to 6 seconds.

With the use of such pressing conditions, a high quality and good compliance with the geometrical tolerances result.

Preferably, the mold with the glass plate placed on top is first preheated in the furnace to a temperature of about 400 to 450° C., then transported out of the furnace for pressing and then transported back into the furnace for carrying out the cooling program.

In the furnace, the controlled cooling is then effected by means of a cooling program over a period of at least 60 minutes, preferably over at least 120 minutes.

Here, cooling is preferably effected starting from a temperature below the lower cooling temperature, preferably beginning at a temperature which is 30 to 100 K below the lower cooling temperature, preferably beginning at 380 to 420° C.

When such a cooling program is used, stresses in the molded glass body can be avoided with certainty.

According to a further configuration of the invention, a mold is used which consists of a tempered martensitic steel, preferably having a C content of 0.2 to 0.6% by weight, more preferably having a C content of 0.3 to 0.5% by weight, more preferably consists of a steel having a chromium content of 14 to 19% by weight, a molybdenum content of 0.5 to 2% by weight and a nickel content of 0 to 2% by weight, particularly preferably consists of the steel No. 1.4122.

It has been found that the use of such a tempered steel results in less wear and scale-free working with high stability.

In a more preferred embodiment, the surface of the mold is coated with a release agent. This may be, for example, graphite powder or boron nitride powder.

By means of this measure, adhesion of the glass body to the mold is avoided.

According to the invention, a method for thermally prestressing a glass body comprising a radiation shielding glass is furthermore disclosed, preferably after bending in the manner described above, comprising the following steps:

supporting the glass body at least at its outer periphery at a number of support points;

introducing the glass body into a furnace which has been preheated to a temperature of 500 to 600° C., preferably to 530 to 570° C.;

heating the glass body to 400° C. to 500° C., preferably to 430 to 470° C.;

removing the glass body from the furnace and blowing a cold fluid onto the glass body on both sides from a plurality of nozzles until the glass body has cooled to a surface temperature of not more than 150° C., preferably to not more than 120° C., particularly preferably to not more than 100° C.

It has been found that, by means of such a procedure, thermal prestressing of a glass body consisting of a radiation shielding glass is possible in a reliable manner and results in a substantial increase in strength compared with a glass body which has not been thermally prestressed.

According to a further configuration of the invention, the glass body is subjected to an air blast which is preferably approximately at room temperature or has been cooled.

The fluid or the air blast preferably emerges at a pressure of 10 to 20 millibars in the direction of the glass body.

Under these boundary conditions, reliable thermal prestressing of the glass body consisting of radiation shielding glass is permitted.

The above-described bending process and the above-described thermal prestressing of the radiation shielding glass are suitable in particular for a radiation shielding glass which has a very high proportion of heavy metal oxide and a density of at least 4000 $kg/m^3$, preferably of at least 4900 $kg/m^3$.

This is preferably a heavy flint glass which has a lead oxide content of at least 60% by weight.

Furthermore, the radiation shielding glass may preferably contain 25 to 30% by weight of silica and 2 to 6% by weight of barium oxide as main constituents in addition to lead oxide.

Furthermore, the radiation shielding glass may additionally contain 0.1% by weight to 3% by weight, preferably 0.5 to 2% by weight, of at least one further constituent which is selected from the group consisting of alumina, zirconium oxide and an alkali metal oxide, and optionally refining agents in customary amounts of up to 2% by weight.

Furthermore, the radiation shielding glass may have a thickness of 3.0 to 25.0 mm.

BRIEF DESCRIPTION OF THE DRAWINGS

Further features and advantages of the invention are evident from the following description of preferred working examples with reference to the drawings, in which.

DESCRIPTION OF PREFERRED EMBODIMENTS

Table 1 summarizes the most important data of the radiation shielding glass RD 50® which is produced and marketed by Schott AG, Mainz.

Figure 1:
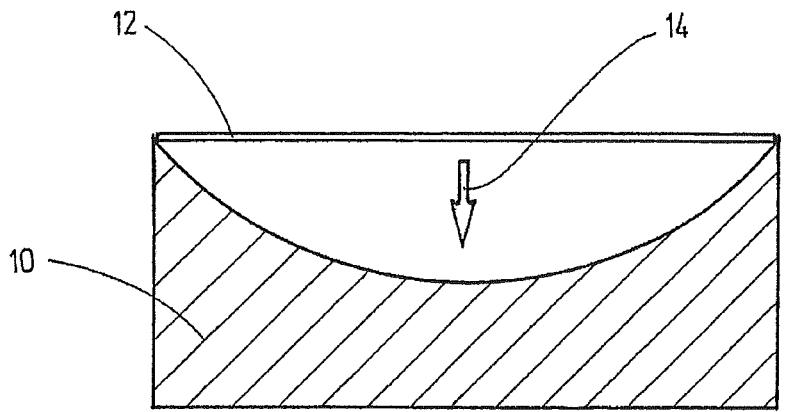
FIG. 1 shows a schematic diagram of a glass bending process according to the invention with the use of gravitational molding.
Figure 2:
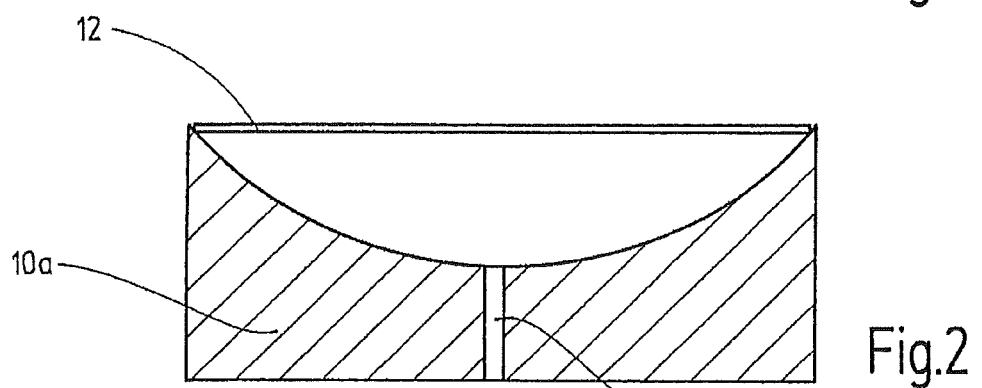
FIG. 2 shows a schematic diagram of a glass bending process according to the invention with the use of vacuum molding.
Figure 3:
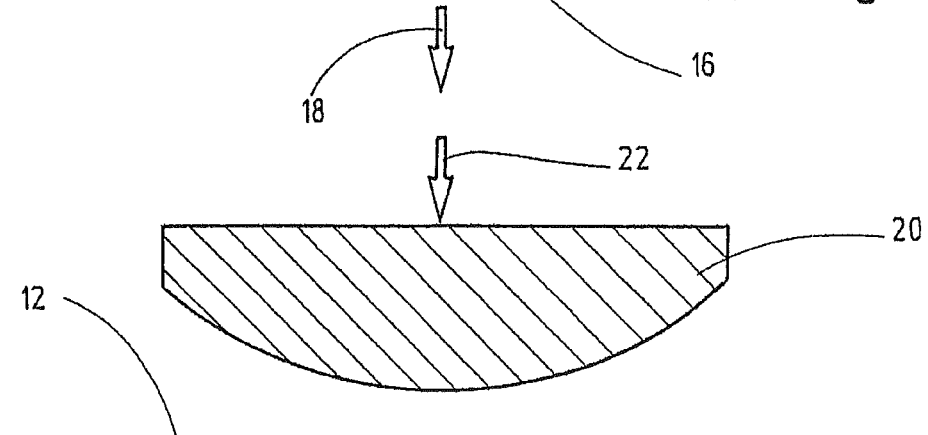
FIG. 3 shows a schematic diagram of a glass bending process according to the invention with the use of press molding and FIG. 4 shows a schematic diagram of thermal prestressing of radiation shielding glass.
Figure 3:
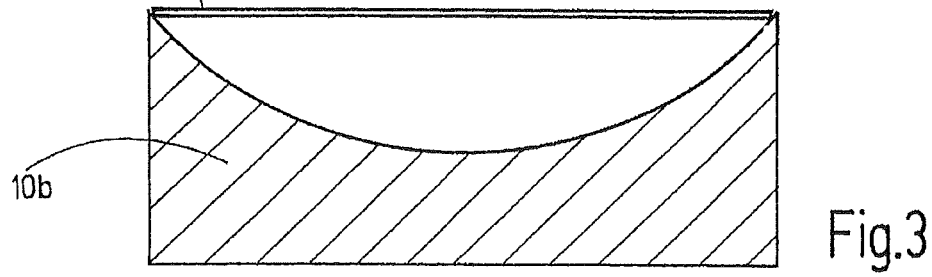

FIGS. 1 to 3 show schematically different possibilities for shaping or 3-dimensional bending of glass.

FIG. 1 shows gravitational molding. Here, a glass plate 12 is placed on a preheated mold 10 and heated further in a suitable manner. The glass plate 12 gradually comes to rest on the surface of the mold 10 in the direction of the arrow 14 under the influence of its gravitational force.

FIG. 2 shows the same process with vacuum support, which is also known as vacuum molding or deep drawing. Here, a mold 10a is provided with one or more suction channels 16 to which a vacuum is applied in the direction of the arrow 18. The glass plate 12 comes to rest thereby on the inner surface of the mold 10a with additional support by the vacuum.

TABLE 1

| Composition (% by weight) | |
| --- | --- |
| SiO$_2$ | 28.0 |
| Al$_2$O$_3$ | 1.0 |
| K$_2$O | 1.0 |
| BaO | 4.0 |
| ZrO$_2$ | 1.0 |
| PbO | 64.5 |
| Sb$_2$O$_3$ | 0.5 |
| Density (kg/m$^3$) | >5050 |
| Refractive index | 1.79 |
| Transformation temp. T$_g$(° C.) | 467 |
| α$_{20-300}$ (ppm) | 7.4 |

| Viscosity lg η (dPas) | | Temp. (° C.) |
| --- | --- | --- |
| Lower cooling temp. | 14.5 | 444 |
| Upper cooling temp. | 13.0 | 467 |
| Softening temp. | 7.6 | 603 |
| Shaping temp. | 6.0 | 673 |
| Shaping temp. | 5.0 | 729 |
| Shaping temp. | 4.0 | 800 |
| Attenuation equivalent (for Pb in % of glass thickness): | | |
| For nominal thickness 7.5 mm | | |
| At 100 kV/0.25 mm Cu | | 30.5 |
| At 200 kV/1.20 mm Cu | | 28.6 |
| For nominal thickness ≥10 mm | | |
| At 100 kV/0.25 mm Cu | | 30.0 |
| At 200 kV/1.20 mm Cu | | 28.9 |

FIG. 3 schematically shows the press molding of a glass plate 12. The glass plate 12 is once again placed on a preheated mold 10b and preferably further heated in a furnace. For the actual shaping process, a male mold 20 travels downwards in the direction of the arrow 22, with the result that the glass plate 12 is pressed into the mold 10b with the aid of the male mold 20. Here, the male mold 20 has a substantially lower temperature than the glass plate 12 and than the mold 10b. In this way, adhesion is counteracted. In addition, the surface of the male mold 20 is covered with a suitable release agent, for example with a woven glass filament fabric. As a result, any tendency to adhere is further counteracted.

The method according to the invention for bending radiation shielding glass was tried out on glass RD 50® by all three bending methods.

The mold 10 or 10a or 10b consisted in all cases of the martensitic steel 1.4122. According to the manufacturer's data (ThyssenKrupp Materials, Switzerland), this has a chemical composition of 0.33 to 0.45% by weight of C, 15.5 to 17.5% by weight of Cr, 0.8 to 1.3% by weight of Mo and 0 to 1.0% by weight of Ni.

The molds were processed beforehand by grinding or turning, and the surface was finally very finely turned or polished.

The heat treatment by annealing, hardening and tempering was effected according to the manufacturer's data.

Samples measuring 500×800 mm and having a thickness of 6 mm were produced from the glass RD 50®. This glass is produced in a gas-operated melting furnace in which all components required for glass production are introduced into a clay pot and melted with considerable heat. The glass melt is then rolled between two steel rolls to glass plates and tempered in a cooling oven. This process damages the surfaces, so that it is not possible to see through them. Surface processing on both sides is then effected by grinding with diamond-coated tools and polishing with the aid of polishing felts and cerium oxide to produce a transparent pane.

Samples measuring 500×800 mm and having a thickness of 6 mm were cut from such glass plates.

Example 1

The mold 10 is first treated with a release agent, for example with graphite powder, and then preheated in a furnace, initially to 350 to 400° C. Thereafter, a cold glass plate was placed on top. Further heating in the furnace was then effected to 400° C. over a period of 60 minutes and finally heating to about 480° C. over a period of 30 minutes. Gravitational molding, as shown in FIG. 1, took place during this procedure. This was followed by cooling in the mold 10 with the following temperature program: cooling to 400° C. over 60 minutes, further cooling to 300° C. over 70 minutes, further cooling to 200° C. over 60 minutes, further cooling to 150° C. over 20 minutes, finally cooling to 70° C. over 30 minutes. The molded glass body was then removed.

Example 2

The same data as in Example 1 were used. However, as shown schematically in FIG. 2, the vacuum was additionally employed as an aid. The mold 10a was subjected to a reduced pressure of about 70 kPa.

Example 3

As in Examples 1 and 2, a glass plate measuring 500×800 mm×thickness of 6 mm comprising the radiation shielding glass RD 50® was used. The mold 10b was produced in the same manner as described above and pretreated by applying a release agent (graphite powder). A double pressing process according to FIG. 3 was then used.

For this purpose, the mold was first preheated in the furnace to about 350 to 400° C., the cold glass plate was placed on top and brief heating was then effected again in the furnace to about 400 to 450° C. Thereafter, the mold 10b with the glass plate 12 placed on top was transported out of the furnace and a male mold 20 consisting of an aluminum alloy and covered with a woven glass filament fabric was gradually moved downwards up to a maximum pressure of about 6 bars by a pneumatic cylinder in order to press the glass plate 12 against the inner surface of the mold 10b. The pressing process lasted for about 4 to 5 seconds. The male mold was then immediately transported away again in an upward direction and the mold 10b with the molded body on top was transported back into the furnace and cooled from 400° C. to 70° C., once again with the same program as in Examples 1 and 2, i.e. initial holding over 60 minutes at 400° C., then cooling to 300° C. over 70 minutes, etc.

In all three cases, the glass plate was deformed by an amount of about 200 mm in the middle in a downward direction. This constituted 3-dimensional deformation.

In all three cases, good tolerances and surface qualities of the moldings produced were obtained.

Deformation to a spherical shape or a correspondingly shaped channel is possible.

Glass geometries according to Example 1, produced by gravitational molding, were then following removal from the mold, further processed by thermal prestressing.

Figure 4:
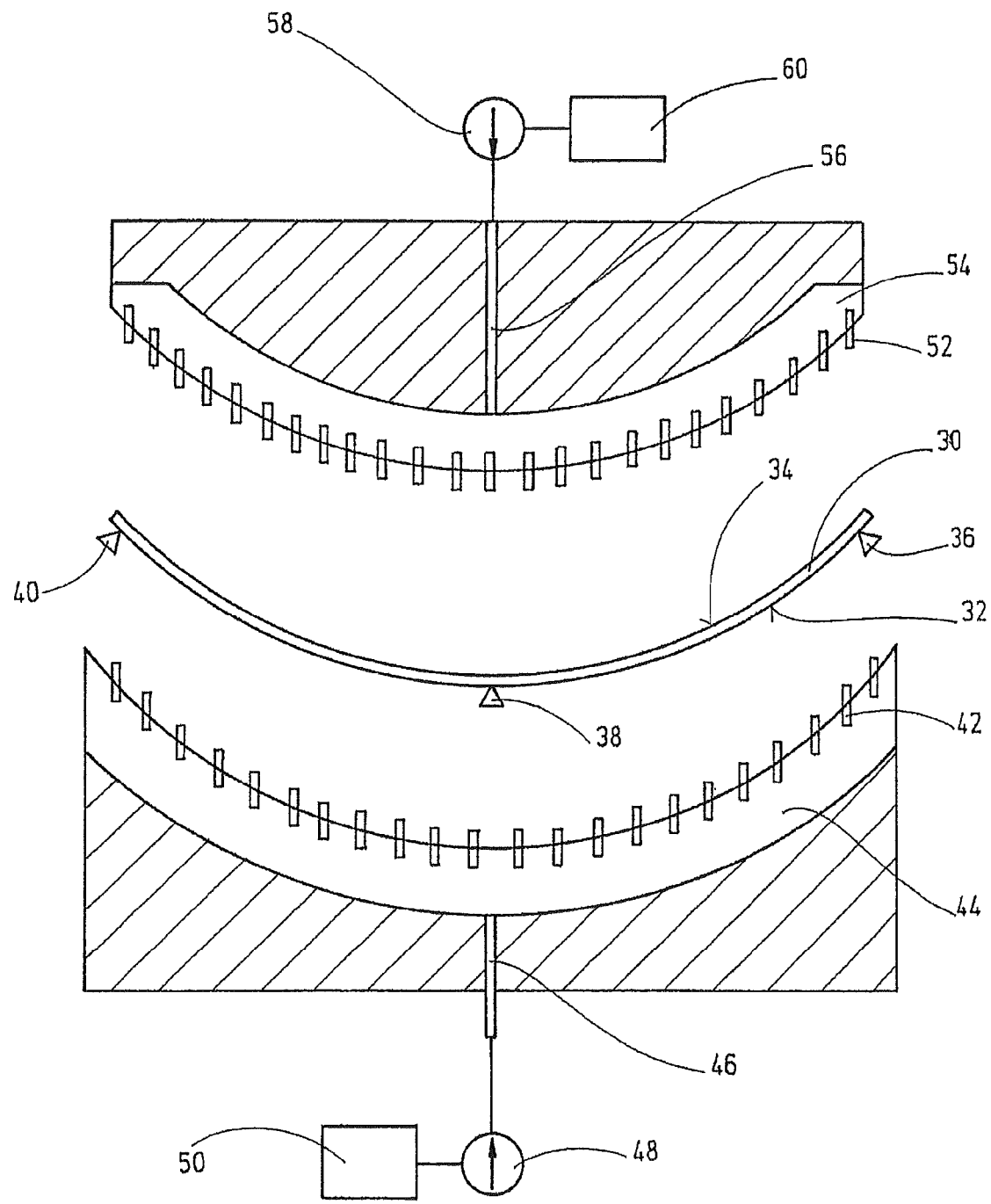

In thermal prestressing according to FIG. 4, the glass body 30 is placed in a suitable manner on a rack on which it is supported in its edge region and optionally additionally in its middle region at support points 36, 38, 40. The glass body 30 is then transported into a preheated furnace at about 550° C. and heated over a relatively long period of about 15 minutes to about 450° C. Thereafter, the glass body 30 is transported out of the furnace and has blasts directed both onto its bottom 32 and onto its top 34 via a plurality of nozzles 42 or 52. The air is fed via a fan 48, which has an intake via a filter 50, and via a channel 46 into a distributor space 44. The distributor space 44 has, on its top facing the glass body 30, a multiplicity of nozzles 42 which are arranged at equal distances to one another and cover the total surface.

In a corresponding manner, a distributor space 54 whose outer surface approximately replicates the shape of the glass body 30 and on which a multiplicity of nozzles 52 are present is provided above the glass body 30. Once again, air from outside is sucked via a fan 58 and a filter 60 and fed via a channel 56 into the distributor space 54. The outflow pressure is about 15 millibar.

Example 4

A glass plate comprising the radiation shielding glass RD 50®, measuring 500×800 mm and having a thickness of 6 mm, was first bent according to Example 1 and then placed on a rack and supported in its edge region at 12-16 support points altogether and additionally in the middle region by 4-8 support points. After preheating in the furnace at 550° C. over about 15 minutes, the glass body 30 was transported out of the furnace and subjected to an air blast from both sides until the temperature on its surface had fallen to about 100° C. Thereafter, the cooling process was terminated and natural cooling to room temperature took place.

A quench test (TWB test according to DIN IEC 60747) was carried out on glass bodies molded according to Example 1 (not thermally prestressed) and glass bodies additionally thermally prestressed according to Example 4. The glass bodies are heated to 70° C. to 160° C. and then sprayed with cold water at about 15° C.

In the case of glass bodies which are not prestressed, fracture occurred simply on heating to 70° C. and spraying with cold water.

Prestressed glass bodies on the other hand were heated up to 160° C. without a fracture occurring on spraying with cold water. The test was then terminated.

The results of a ball drop test (IEC 60601, formerly DIN 4646) of prestressed and non-prestressed glass bodies are summarized in Table 2.

TABLE 2

| Ball drop test | | | | |
|---|---|---|---|---|
| Height of drop (72 grams) | 1.5 m | 1.6 m | 1.7 m | 1.8 m |
| Energy in joules | 1.059 | 1.130 | 1.201 | 1.271 |
| Without prestressing | OK | OK | OK | Fracture |
| With prestressing | OK | OK | OK | OK |
| Height of drop (226 grams) | 1.5 m | 1.6 m | 1.7 m | 1.8 m |
| Energy in joules | 3.326 | 3.547 | 3.769 | 3.991 |
| Without prestressing | Fracture | — | — | — |
| With prestressing | OK | OK | OK | OK |

What is claimed is:

1. A method for bending and thermally prestressing radiation shielding glass, comprising the following steps:
   (a) providing a mold;
   (b) providing a glass plate comprising a radiation shielding glass;
   (c) preheating said mold to a temperature of 300 to 400° C.;
   (d) placing said glass plate on said mold;
   (e) heating said glass plate and said mold together to a temperature of 370 to 430° C.;
   (f) further heating to a temperature of 400° C. to 500° C., steps (e) and (f) together lasting for at least 30 minutes;
   (g) molding said glass plate into its final form;
   (h) cooling said glass plate after molding to a temperature of not more than 150° C. by means of a cooling program over a period of at least 60 minutes;
   (i) removing the glass body from the mold; and thereafter thermally prestressing the radiation shielding glass by:
   (j) supporting said glass body at a plurality of support points including at least at its outer periphery and at an intermediate point;
   (k) introducing said glass body into a furnace which has been preheated to a temperature of 500 to 600° C.;
   (l) heating said glass body to 400° C. to 500° C.;
   (m) removing said glass body from said furnace; and
   (n) blowing a cold fluid onto said glass body on both sides from a plurality of nozzles until said glass body has cooled to a surface temperature of not more than 150° C.

2. The method according to claim 1, wherein said glass plate is molded under the influence of gravity.

3. The method according to claim 1, wherein said heating, molding and cooling steps are effected in a furnace.

4. The method according to claim 1, wherein said molding step is assisted by application of a vacuum.

5. The method according to claim 1, wherein during said molding step said glass plate is pressed into said mold by a male mold conforming to said final form.

6. The method according to claim 5, wherein said male mold has, on its surface, a release layer.

7. The method according to claim 5, wherein said male mold is preheated to a temperature which is at least 100° K below the preheating temperature of the mold.

8. The method according to claim 5, wherein a contact pressure is gradually built up to a pressure of 8 bar.

9. The method according to claim 8, wherein said pressing time is 2 to 30 seconds.

10. The method according to claim 5, wherein said mold with said glass plate placed on top is transported out of a furnace for pressing, and is then transported back into said furnace for carrying out said cooling program according to step (h).

11. The method according to claim 1, wherein a mold is used which is selected from the group consisting of a tempered martensitic steel having a C content of 0.2 to 0.6% by weight, a steel having a chromium content of 14 to 19% by weight, a molybdenum content of 0.5 to 2% by weight and a nickel content of 0 to 2% by weight, and the steel No. 1.4122.

12. The method according to claim 1, wherein said mold at a surface thereof is coated with a release agent which is selected from the group consisting of graphite powder and boron nitride powder.

13. The method according to claim 1, wherein said radiation shielding glass is selected from the group consisting of a heavy flint glass having a heavy metal oxide content of at least 50% by weight, and a lead glass having a lead oxide content of at least 60% by weight.

14. The method according to claim 1, wherein said radiation shielding glass contains 25 to 30% by weight of silica and 2 to 6% by weight of barium oxide as main constituents in addition to lead oxide.

15. The method according to claim 1, wherein said cooling program is performed over a period of between 60 minutes and 240 minutes.

16. A method for bending radiation shielding glass, comprising the following steps:
   (a) providing a mold;
   (b) providing a glass plate comprising a radiation shielding glass;
   (c) preheating said mold to a temperature of 300 to 400° C.;

(d) placing said glass plate on said mold;
(e) heating said glass plate and said mold together to a temperature of 370 to 430° C.;
(f) further heating to a temperature of 400° C. to 500° C., steps (e) and (f) together lasting for at least 30 minutes;
(g) molding said glass plate while said glass plate is pressed into said mold by a male mold which is covered by a woven glass filament fabric; and
(h) cooling said glass plate after molding to a temperature of not more than 150° C. by means of a cooling program over a period of between 60 minutes and 240 minutes.

17. The method according to claim 1, wherein said cold fluid emerges at a pressure of 10 to 20 millibar in the direction of said glass body.

* * * * *